(12) United States Patent
Lin

(10) Patent No.: US 6,595,115 B1
(45) Date of Patent: Jul. 22, 2003

(54) TEMPERATURE SENSOR FOR A COOKING DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/314,554

(22) Filed: Dec. 9, 2002

(51) Int. Cl.[7] .................. A47J 37/00; A47J 37/04; A47J 37/06; A47J 37/08; A23L 1/00
(52) U.S. Cl. .................. 99/342; 99/331; 99/349; 99/372; 99/374; 99/375; 99/378; 99/425; 99/445; 99/446
(58) Field of Search .................... 99/331–333, 342–344, 99/339, 340, 349–351, 352–355, 372–382, 400, 401, 444–450, 422–425, 481, 482; 126/20, 369, 41 R; 219/521, 524, 538, 401, 586, 446.1, 448.11, 450.1, 451.1, 447.1; 426/523

(56) References Cited

U.S. PATENT DOCUMENTS

| | | | | |
|---|---|---|---|---|
| 3,880,064 A | * | 4/1975 | Martinex | 99/349 |
| 4,972,766 A | * | 11/1990 | Anetsberger | 99/332 |
| 5,473,976 A | * | 12/1995 | Hermansson | 99/349 |
| 5,531,155 A | * | 7/1996 | Pellicane et al. | 99/372 |
| 5,555,794 A | * | 9/1996 | Templeton et al. | 99/349 |
| 5,655,434 A | * | 8/1997 | Liebemann | 99/353 |
| 5,676,046 A | * | 10/1997 | Taber et al. | 99/340 |
| 5,755,150 A | * | 5/1998 | Matsumoto et al. | 99/372 |
| 5,771,782 A | * | 6/1998 | Taber et al. | 99/385 X |
| 5,802,958 A | * | 9/1998 | Hermansson | 99/379 X |
| 5,839,359 A | * | 11/1998 | Gardner | 99/349 |
| 5,881,634 A | * | 3/1999 | Newton | 99/379 X |
| 5,890,419 A | * | 4/1999 | Moravec | 99/349 |

* cited by examiner

Primary Examiner—Timothy F. Simone
(74) Attorney, Agent, or Firm—Alan D. Kamrath; Rider Bennett, LLP

(57) ABSTRACT

A cooking device comprises a lower cooking plate including a flat top area, parallel, widthwise ribs on the top area, and pairs of arcuate, opposite projections on the top area; an upper cooking plate including a flat bottom area, parallel, widthwise ribs on the bottom area, and holes at the bottom area; and a temperature sensor including a circuit board in the upper plate, temperature sensing units disposed at the holes and being coupled to the circuit board, and an indicator lamp on the device. Foodstuffs placed in the pairs of arcuate, opposite projection are held in position by the ribs with the pointed ends of the sensing units inserted into the foodstuffs. Temperature of the foodstuffs is sensed by the sensing units. Further, the lamp is lit if the foodstuffs are thoroughly cooked.

2 Claims, 5 Drawing Sheets

(I-I)

(II - II)

TEMPERATURE SENSOR FOR A COOKING DEVICE

FIELD OF THE INVENTION

The present invention relates to cooking appliances and more particularly to a temperature sensor for a cooking device with improved characteristics.

BACKGROUND OF THE INVENTION

Timers for various devices are well known. Also, a temperature sensor installed in a cooking device for cutting off power when the temperature of a foodstuff being cooked has exceeded a predetermined value in order to prevent the foodstuff from being burned are known in the art. However, the prior art temperature sensor suffered from a disadvantage. For example, foodstuffs having thickness different from the default thickness may be burned since it is not taken account precisely. Thus improvement in this field exists.

SUMMARY OF THE INVENTION

It is therefore an object of the present invention to provide a temperature sensor for a cooking device wherein variations in the thickness of foodstuffs are fully taken account so as to not only thoroughly cook the foodstuffs but also issue a visual indication as it occurs.

In one aspect of the present invention, there is provided a cooking device comprising a lower cooking plate of rectangular shape including a flat top area, a plurality of parallel, widthwise ribs on the top area, and a plurality of pairs of arcuate, opposite projections on the top area; an upper cooking plate of rectangular shape including a flat bottom area, a plurality of parallel, widthwise ribs on the bottom area, and a plurality of holes at the bottom area; and a temperature sensor including a circuit board embedded in the upper plate, a plurality of pointed temperature sensing units disposed at the holes and being coupled to the below circuit board, and an indicator lamp on the housing of the cooking device and electrically coupled to the circuit board, wherein a plurality of foodstuffs each is placed in one pair of the arcuate, opposite projections or across two pairs of the arcuate, opposite projections for being held in position by the ribs with the foodstuffs compressed between the upper and lower plates and the pointed ends of the temperature sensing units inserted into the foodstuffs, the temperature of the foodstuffs being cooked is sensed by the temperature sensing units, the temperature of the foodstuffs is converted into electrical signals by the circuit board, and the indicator lamp is lit or flashed when the temperature has reached a predetermined value.

In another aspect of the present invention, there is provided a cooking device comprising a lower cooking plate of rectangular shape including a flat top area, a plurality of parallel, widthwise ribs on the top area, and a plurality of holes at the top area; an upper cooking plate of rectangular shape including a flat bottom area, a plurality of parallel, widthwise ribs on the bottom area, and a plurality of pairs of arcuate, opposite projections on the bottom area; and a temperature sensor including a circuit board embedded in the lower plate, a plurality of pointed temperature sensing units disposed at the holes and being coupled to the below circuit board, and an indicator lamp on the housing of the cooking device and electrically coupled to the circuit board, wherein a plurality of foodstuffs each is placed in one pair of the arcuate, opposite projections or across two pairs of the arcuate, opposite projections for being held in position by the ribs with the foodstuffs compressed between the upper and lower plates and the pointed ends of the temperature sensing units inserted into the foodstuffs, the temperature of the foodstuffs being cooked is sensed by the temperature sensing units, the temperature of the foodstuffs is converted into electrical signals by the circuit board, and the indicator lamp is lit or flashed when the temperature has reached a predetermined value.

The above and other objects, features and advantages of the present invention will become apparent from the following detailed description taken with the accompanying drawings.

DETAILED DESCRIPTION OF THE PREFERRED EMBODIMENTS

Figure 1:
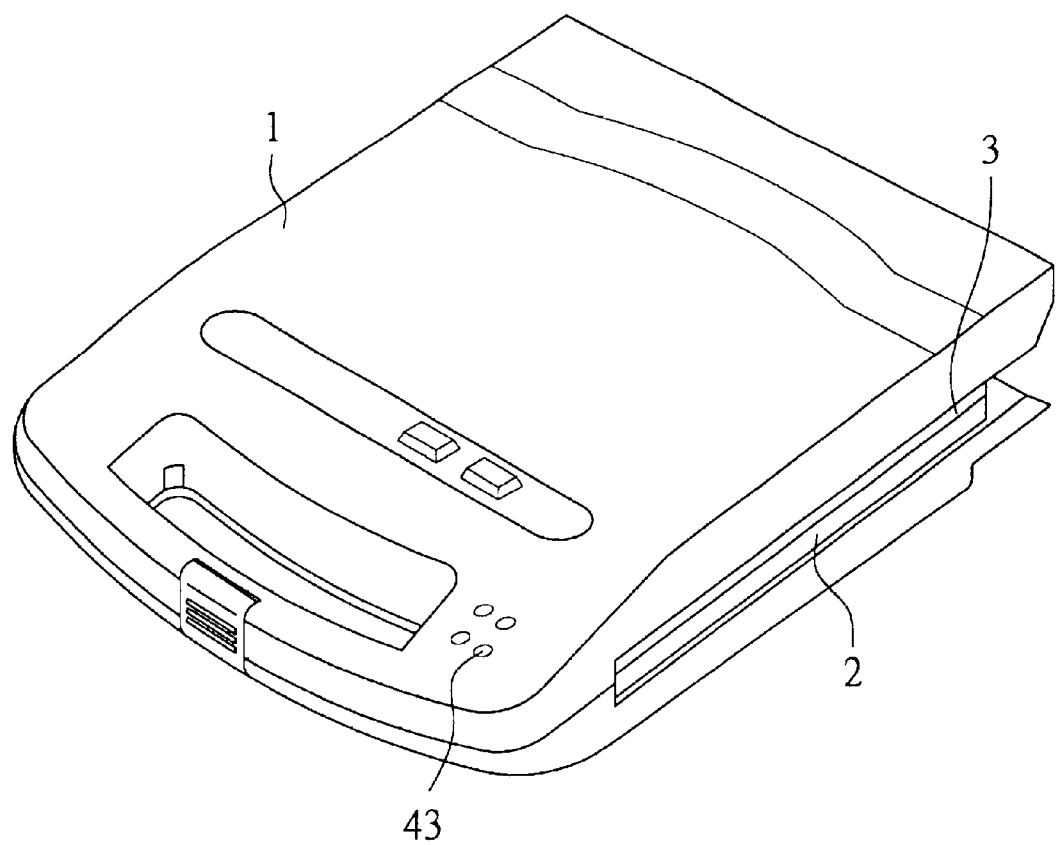
FIG. 1 is a perspective view of a cooking device incorporating a temperature sensor according to the invention.

Referring to FIGS. 1 to 6, there is shown a cooking device 1 constructed in accordance with the invention. The cooking device 1 comprises a pair of hingedly coupled upper cooking plate and lower cooking plate 3 and 2 and a temperature sensor 4. Each component is described in detail below. The lower cooking plate 2 is a rectangular body and comprises a flat top area 21 circumscribed by a raised peripheral edge, a plurality of parallel, widthwise ribs 22 on the top area 21, and a plurality of pairs of arcuate, opposite projections 23 on the top area 21. The upper cooking plate 3 comprises a flat bottom area 33 circumscribed by a raised peripheral edge, a plurality of parallel, widthwise ribs 31 on the bottom area 33, and a plurality of holes 32 at the bottom area 33. The temperature sensor 4 comprises a circuit board 42 embedded in the upper plate 3, a plurality of pointed temperature sensing units 41 disposed at the holes 32 and being coupled to the below circuit board 42, and an indicator lamp 43 on the housing of the cooking device 1. Note that the circuit board 42 and the temperature sensing units 41 may be formed in the lower cooking plate 2 in another embodiment without departing from the scope and spirit of the invention.

Figure 8:
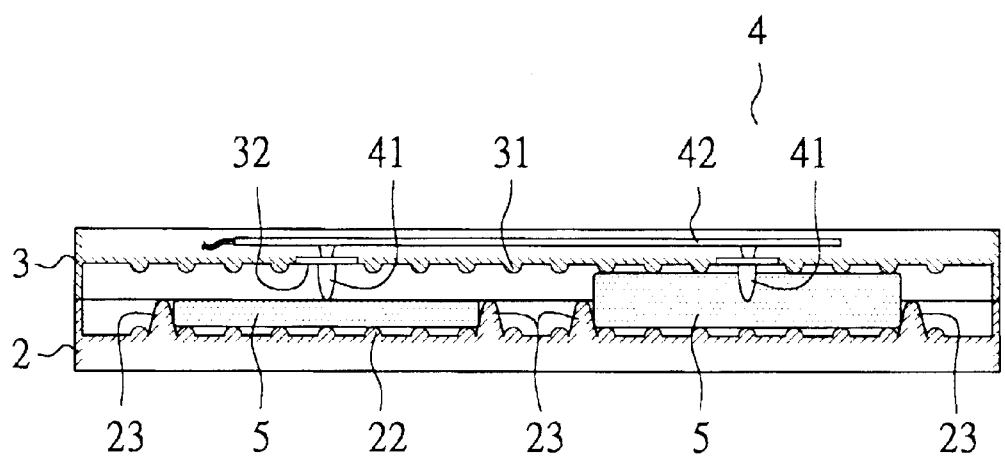
FIG. 8 is a cross-sectional view of FIG. 7 in a closed position.
Figure 2:
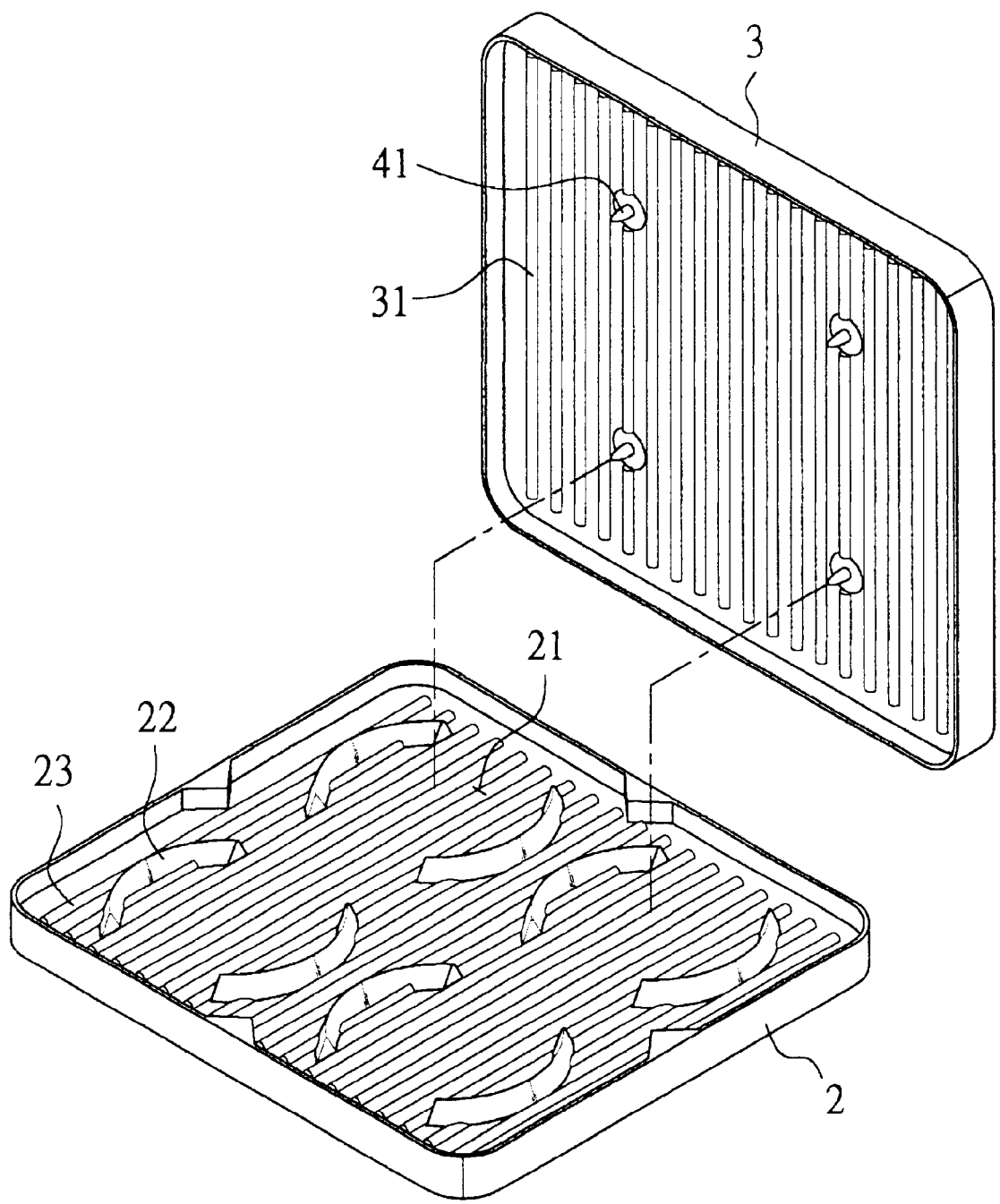
FIG. 2 is a perspective view of upper and lower cooking plates.
Figure 3:
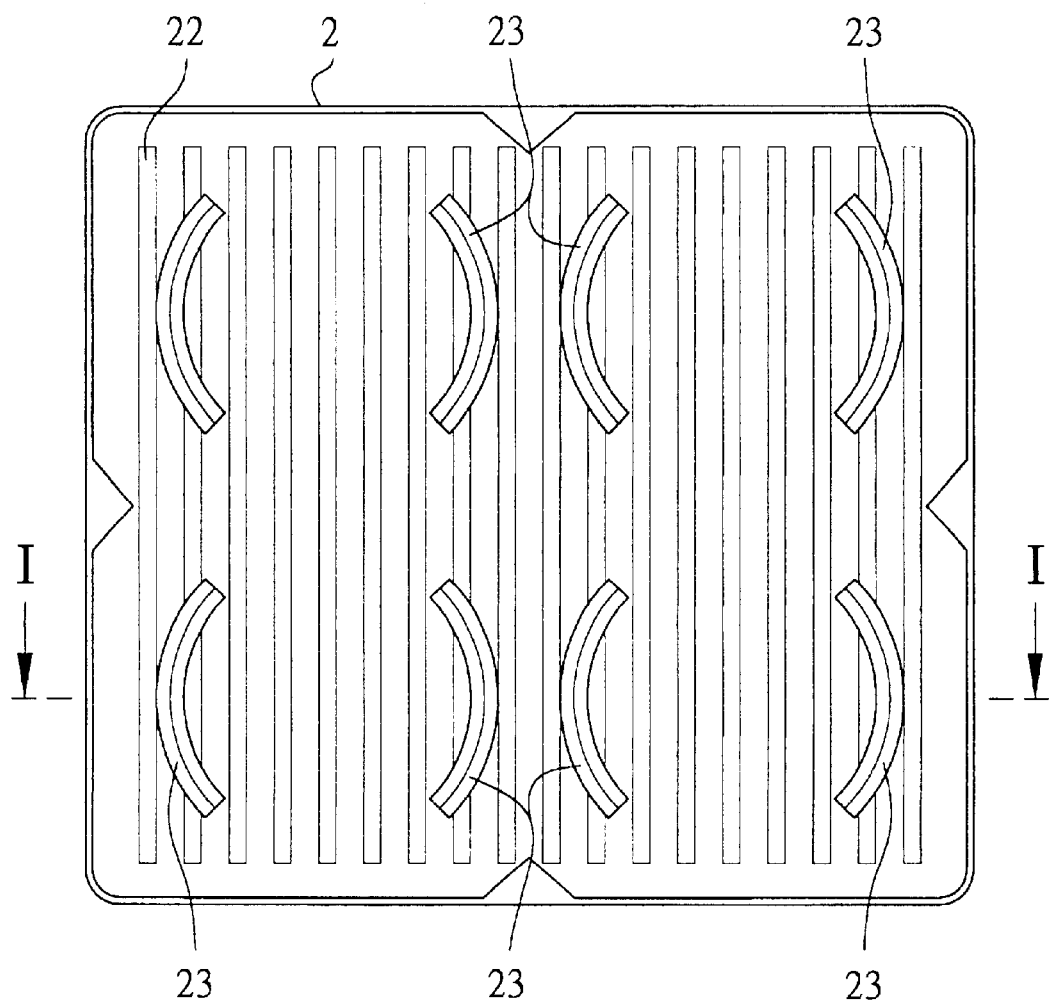
FIG. 3 is a top plan view of the lower cooking plate shown in FIG. 2.
Figure 4:
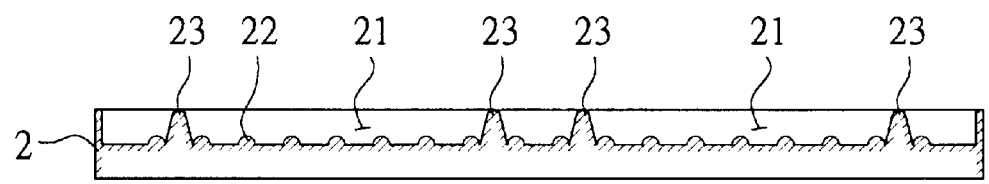
FIG. 4 is a cross-sectional view of the lower cooking plate taken along line I—I of FIG. 3.
Figure 5:
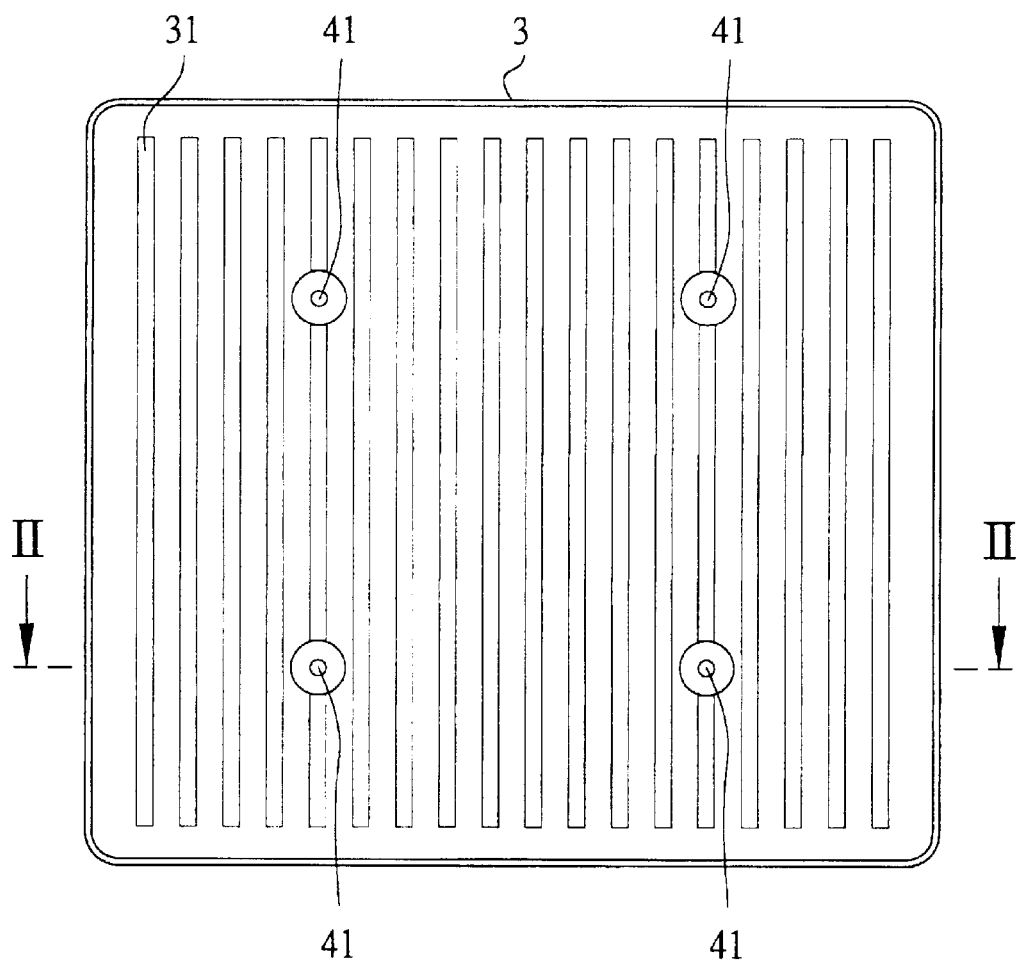
FIG. 5 is a bottom plan view of the upper cooking plate shown in FIG. 2.
Figure 6:
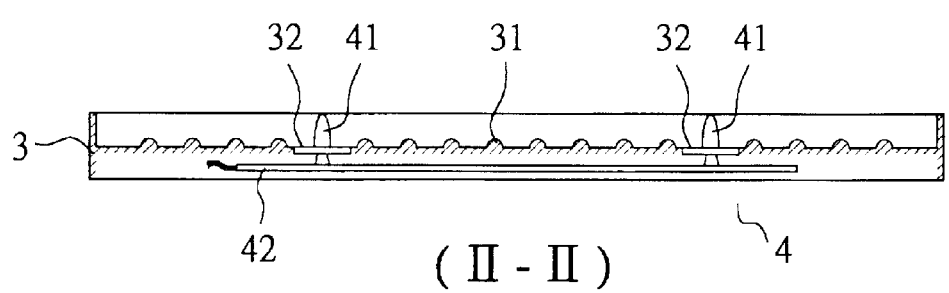
FIG. 6 is a cross-sectional view of the upper cooking plate taken along line II—II of FIG. 5.
Figure 7:
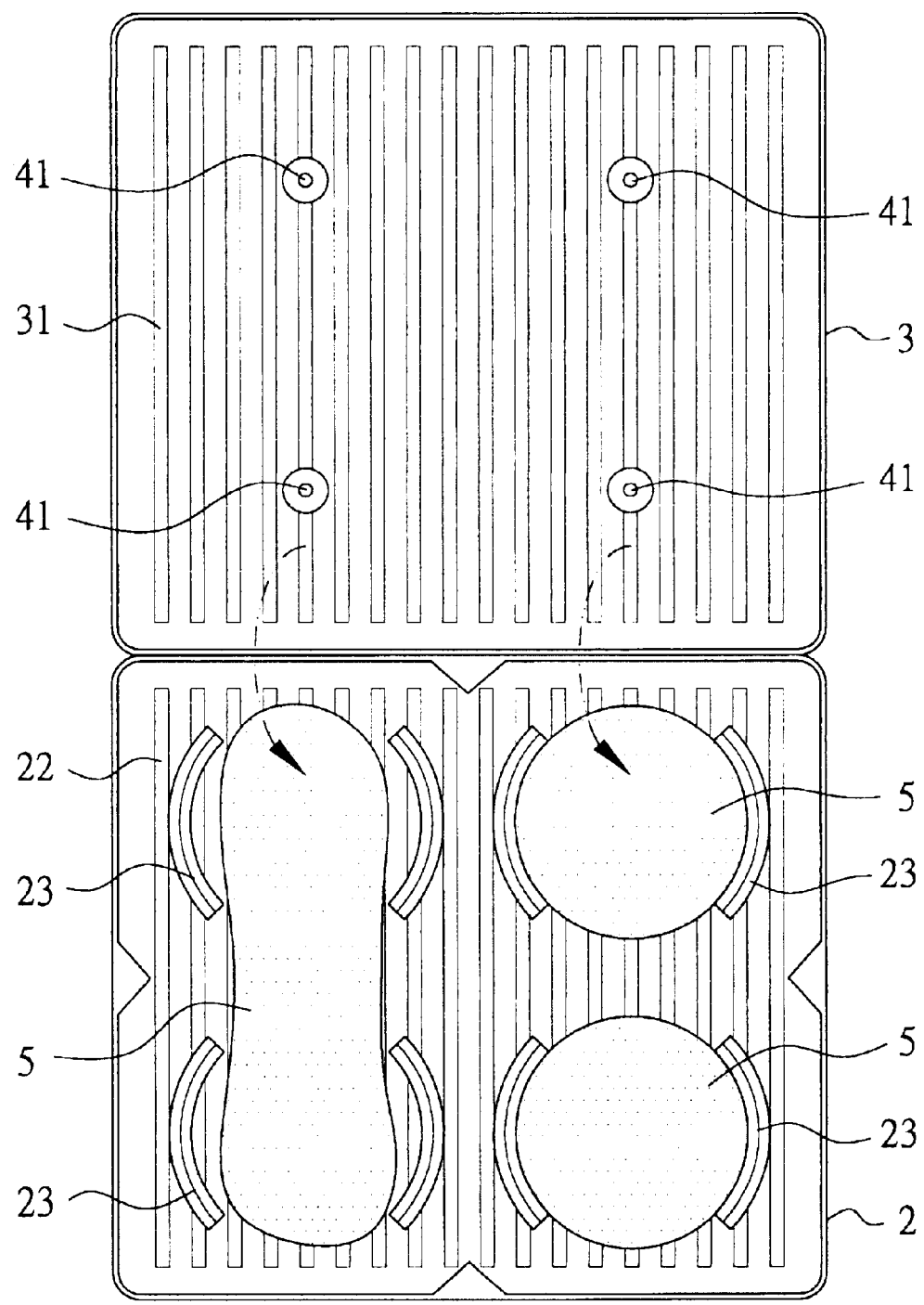
FIG. 7 is a perspective view of the open upper and lower cooking plates with a plurality of foodstuffs placed on the lower cooking plate.

Referring to FIGS. 7 and 8, an operation of the invention will now be described in detail below. A plurality of foodstuffs (e.g., steaks) 5 each is placed in one pair of the arcuate, opposite projections 23 or across two pairs of the arcuate, opposite projections 23 for being held in position by the ribs 22 and 31. Next, bring down the upper cooking plate 3 on the lower cooking plate 2 so that the steaks 5 are compressed slightly between them. At the same time, the pointed ends of the temperature sensing units 41 are inserted into the steaks 5. Hence, the temperature of the steaks 5 being cooked in the cooking device 1 will rise. The temperature sensing units 41 can sense the increased temperature of the steaks 5 in an enhanced precision. The circuit board 42 then converts the sensed temperature into electrical signals. The indicator lamp 43 electrically connected to the circuit board 42 will be lit or flashed for visually informing a user when the temperature has reached a predetermined warning value which means a thoroughly cooked meal. As an end, the purpose of preventing foodstuff from being burned during cooking is achieved.

While the invention has been described by means of specific embodiments, numerous modifications and variations could be made thereto by those skilled in the art without departing from the scope and spirit of the invention set forth in the claims.

What is claimed is:

1. A cooking device comprising:

a lower cooking plate of rectangular shape including a flat top area, a plurality of parallel, widthwise ribs on the top area, and a plurality of pairs of arcuate, opposite projections on the top area;

an upper cooking plate of rectangular shape including a flat bottom area, a plurality of parallel, widthwise ribs on the bottom area, and a plurality of holes at the bottom area; and a temperature sensor including a circuit board embedded in the upper plate, a plurality of pointed temperature sensing units disposed at the holes and being coupled to the below circuit board, and an indicator lamp on the housing of the cooking device and electrically coupled to the circuit board, wherein a plurality of foodstuffs each is placed in one pair of the arcuate, opposite projections or across two pairs of the arcuate, opposite projections for being held in position by the ribs with the foodstuffs compressed between the upper and lower plates and the pointed ends of the temperature sensing units inserted into the foodstuffs, the temperature of the foodstuffs being cooked is sensed by the temperature sensing units, the temperature of the foodstuffs is converted into electrical signals by the circuit board, and the indicator lamp is lit or flashed when the temperature has reached a predetermined value.

2. A cooking device comprising:

a lower cooking plate of rectangular shape including a flat top area, a plurality of parallel, widthwise ribs on the top area, and a plurality of holes at the top area;

an upper cooking plate of rectangular shape including a flat bottom area, a plurality of parallel, widthwise ribs on the bottom area, and a plurality of pairs of arcuate, opposite projections on the bottom area; and a temperature sensor including a circuit board embedded in the lower plate, a plurality of pointed temperature sensing units disposed at the holes and being coupled to the below circuit board, and an indicator lamp on the housing of the cooking device and electrically coupled to the circuit board, wherein a plurality of foodstuffs each is placed in one pair of the arcuate, opposite projections or across two pairs of the arcuate, opposite projections for being held in position by the ribs with the foodstuffs compressed between the upper and lower plates and the pointed ends of the temperature sensing units inserted into the foodstuffs, the temperature of the foodstuffs being cooked is sensed by the temperature sensing units, the temperature of the foodstuffs is converted into electrical signals by the circuit board, and the indicator lamp is lit or flashed when the temperature has reached a predetermined value.

* * * * *